United States Patent [19]
Khudenko

[11] Patent Number: 6,004,456
[45] Date of Patent: Dec. 21, 1999

[54] EQUALIZATION BASIN-REACTOR SYSTEM

[76] Inventor: Boris Mikhallovich Khudenko, 744 Moores Mill Rd., Atlanta, Ga. 30327

[21] Appl. No.: 09/117,914

[22] PCT Filed: Dec. 9, 1997

[86] PCT No.: PCT/US97/22572

§ 371 Date: Mar. 12, 1999

§ 102(e) Date: Mar. 12, 1999

[87] PCT Pub. No.: WO98/25859

PCT Pub. Date: Jun. 18, 1998

[51] Int. Cl.⁶ .................................................. C02F 3/12
[52] U.S. Cl. ................ 210/122; 210/151; 210/195.3; 210/242.1; 210/255; 210/540; 210/605
[58] Field of Search ................... 210/122, 195.1, 210/195.3, 202, 242.1, 255, 256, 259, 521, 540, 150, 151, 616, 605, 624, 626, 630, 903

[56] References Cited

U.S. PATENT DOCUMENTS

| | | | |
|---|---|---|---|
| 2,579,304 | 12/1951 | Crawford | 210/242.1 |
| 3,054,602 | 9/1962 | Proudman | 210/255 |
| 3,862,040 | 1/1975 | Prevs et al. | 210/540 |
| 4,154,685 | 5/1979 | Marcotte | 210/255 |
| 4,925,552 | 5/1990 | Bateson et al. | 210/255 |
| 4,983,287 | 1/1991 | Arnold | 210/259 |
| 5,192,442 | 3/1993 | Piccirillo et al. | 210/605 |
| 5,433,845 | 7/1995 | Grene et al. | 210/540 |
| 5,556,538 | 9/1996 | Beard et al. | 210/195.1 |
| 5,616,241 | 4/1997 | Khudenko | 210/151 |

*Primary Examiner*—Christopher Upton
*Attorney, Agent, or Firm*—Needle & Rosenberg P.C.

[57] ABSTRACT

This invention is a single stage or a multi-stage apparatus for chemical, physical-chemical, and biological treatment and equalization of variable flows of influent material, wherein said influent material is processed in at least a single reactor or in a plurality of sequential reactors containing liquid and having influent, and having reactor connecting and effluent lines. The improvement to this apparatus comprises:

(1) using at least one reactor for flow equalization, the said reactor is a separate reactor or a reactor selected from the said plurality of sequential reactors, (2) providing the lower elevation flow transfer means attached to the said reactor connecting and effluent lines in the said selected reactors, (3) providing at least one higher elevation flow transfer means attached to the said reactor connecting and effluent lines in at least one of the said at least two selected reactors for the flow equalization, the said at least one of the said at least two selected reactor precedes the said other selected reactors in the plurality of sequential reactors.

22 Claims, 6 Drawing Sheets

EQUALIZATION BASIN-REACTOR SYSTEM

BACKGROUND OF THE INVENTION

1. Field of the Invention

This invention relates to treatment of aqueous materials, particularly, wastewater, and wastewater sludges, and is related to single stage and multistage equalization basin-reactor systems treating variable influent flows.

2. Description of the Prior Art

Many water, wastewater, and other treatment systems have variable influent flows and concentrations. Process controls also produce variable flows and concentrations, for example, through recirculation of various process streams, dilution with the treated streams, by feeding the reagents, and by other control actions. The treatment efficiency depends on the ability of the treatment system to handle the variable characteristics of the influent flows. First, flow and concentration variations are reduced in the treatment system via equalization effects, which are related to the flow patterns and degree of mixing in equalization basins and reactors. Second, the concentration variations are also reduced due to the physical, chemical, physical-chemical, or biological matter transformations. High treatment efficiency and stability, and low capital and operating costs can be provided by utilizing appropriate combinations of flow and concentration equalization basins and reactors. Functions of flow and concentration equalization and materials transformation can be performed in separate flow equalization basins, usually, single or multiple tanks with variable volume of the liquid being treated, concentration equalization basins, single or multiple tanks with a variety of flow and mixing patterns, and in reactors of one or another type. Systems with multiple tank are usually arranged into multistage systems. The equalization and transformation functions can also be performed in a single flow-through tank.

For example, a single tank system known under trade name Biolac (U.S. Pat. Nos. 4,287,062, 4,448,689, 4,797,212) combines flow equalization and treatment functions is a single aerobic reactor with a clarifier having a floating weir or a floating clarifier for collecting the clarified water. The weir flow is equal to or greater than the average design flow. Accordingly, the single reactor provides complete flow equalization. Such a reactor can be divided into sequential process zones (U.S. Pat. No. 5,472,611). However, with a single level floating weir or clarifier at the effluent discharge, this reactor functions as a single tank flow equalization basin. Single flow-through tanks with a single level discharge line and floating clarifiers or weirs handle flow variations in a small to moderate range well. For example, these tanks are used for equalizing variations of municipal wastewater flows within a day and industrial wastewater flows within a production shift or a day. However, the required volume of these tanks becomes very large when combined storm and municipal, or industrial, flows need to be equalized. In systems with variable flow recirculations, for example, for diluting or neutralizing the influent, the capacity of single level clarifiers installed for handling minimum to average flows is inadequate. Adding more clarifiers discharging at the same level causes problems with water distribution among clarifiers, or among collection means (such as weirs) in these clarifiers.

If another reactor is added downstream of the single tank equalization basin-reactor, the system becomes a multistage reactor. The downstream reactor will be operated at the constant (equalized) flow rate. The volume of the downstream reactor will stay constant, and it cannot be used for flow equalization. Corresponding depths (liquid level) fluctuations in the first reactor must accommodate all equalization requirements, and will be substantial.

An alternative treatment system for highly variable wastewater flows and concentrations is the sequencing batch reactor (SBR). In this system, usually, two or more single-tank reactors are installed and operated in the periodic mode: filling the wastewater influent, treatment, settling of the sludge, and decanting the wastewater effluent. SBR combines the functions of flow equalization, treatment, and sludge separation in one tank. However, in contrast to multistage systems, it is difficult or impossible to accommodate various process stages, like nitrification and denitrification. With influents having variable flows and concentrations, the end of the treatment period, or a functional treatment step (for example, nitrification) in the sequence of operations is difficult to detect. Accordingly, SBRs are often operated on a time clock set based on a worst case scenario. This results in grossly overdesigned SBR reactors.

The main objective of the present invention is to improve single stage and multi-stage treatment systems, by combining equalization and treatment of wastewater in at least two stages of the multiple stage treatment process. Thus improved systems retain all advantages of multistage systems when treating influents with variable flows and compositions and use more than one reactor for flow equalization. Other advantages will become apparent from the ensuing description of the invention.

SUMMARY OF THE INVENTION

This invention is a single stage or a multi-stage apparatus for treatment and equalization of variable flows of an influent material, wherein said influent material is processed in a plurality of sequential reactors containing liquid and having influent, reactor connecting, and at least two effluent lines. The improvement to a single stage apparatus comprises:

(1) at least one equalization basin-reactor providing means for flow equalization, (2) a lower elevation connecting line connecting first floating flow transfer means within the said equalization basin-reactor to the first of the said at least two effluent lines, wherein the said first effluent line is a lower elevation effluent line, and (3) at least one higher elevation connecting line connecting second floating transfer means within the said at least one equalization basin-reactor to the second of the said at least two effluent lines, wherein the said second effluent line is a higher elevation effluent line.

The improvement to a multi-stage apparatus comprises:

(1) at least two reactors for flow equalization, the said two reactors are selected from the said sequential reactors, (2) providing the lower elevation flow transfer means attached to the said reactor connecting and effluent lines in the said selected reactors, (3) providing at least one higher elevation flow transfer means attached to the said reactor connecting and effluent lines in at least one of the said at least two selected reactors for the flow equalization, the said at least one of the said at least two selected reactors precedes the said other selected reactors in the sequential connection of reactors.

The flow transfer means is selected from a group comprising floating weirs and floating clarifiers, which can be connected to the said reactor connecting and discharge lines by flexible connections. Several reactor connecting lines per reactor can be provided at the same or at different elevations. Floating weirs and clarifiers can be made at least in part from a flexible material, for example, soft plastics. Floating clarifiers are selected from a group comprising Imhoff clarifier, vertical flow clarifiers, horizontal flow rectangular clarifiers, clarifiers with suspended sludge blanket, or other solid liquid separation means. Imhoff clarifiers do not need specific means for sludge evacuation. In other clarifier types, airlifts (or gaslifts), pumps, or other means can be used for sludge evacuation.

This apparatus further includes the means for directing said influent material to more than one of the said stages simultaneously. The influent can be split into equal or unequal flows and each of these flows can be directed to more than one of the said stages simultaneously via floating cut off weirs with flexible lines leading to the downstream reactors. Floating cut off weirs is convenient means for controlling the delivery of the influent to downstream reactors because they descend in the first reactor during low flow periods and cut off the flow to the downstream, and when the flow increases they rise and transfer part of the higher flow rate to the downstream reactors.

The apparatus further includes the means for transferring at least one flow of the liquid contained in at least one reactor into the same or at least one different reactor in the said plurality of reactors. The said means can be a floating weir, including a cut off floating weir.

The stages in the present apparatus include anaerobic, facultative, anoxic, aerobic and polishing reactors for biological processes. These sequential reactors can comprise alternating anaerobic (or facultative nonaerated) and aerobic reactors. The apparatus also includes alternating reactors selected from the group consisting of anaerobic and aerobic zones, and alternating aerobic and anaerobic conditions in the same reaction vessel. Additionally, a special reactor stage can be provided for exposing said influent material and intermediate metabolic products to both anaerobic and aerobic biomass simultaneously (U.S. Pat. Nos. 5,514,277 and 5,514,278)

The improved apparatus further includes at least one sludge conditioning zone in at least one reactor in the said plurality of sequential reactors. The sludge conditioning zones can be aerobic and anaerobic zones. Sludge conditioning zones can be provided with means for recycling the conditioned sludge from the said sludge conditioning zone in at least one reactor, any reactor, in the said plurality of sequential reactors. The means for transferring the conditioned sludge from the said at least one sludge conditioning zone in at least one other reactor in the said plurality of sequential reactors is also provided.

The present apparatus further includes the means for adding powdered activated carbon in at least one reactor in the said plurality of sequential reactors.

DETAILED DESCRIPTION OF THE EMBODIMENTS

Figure 1:
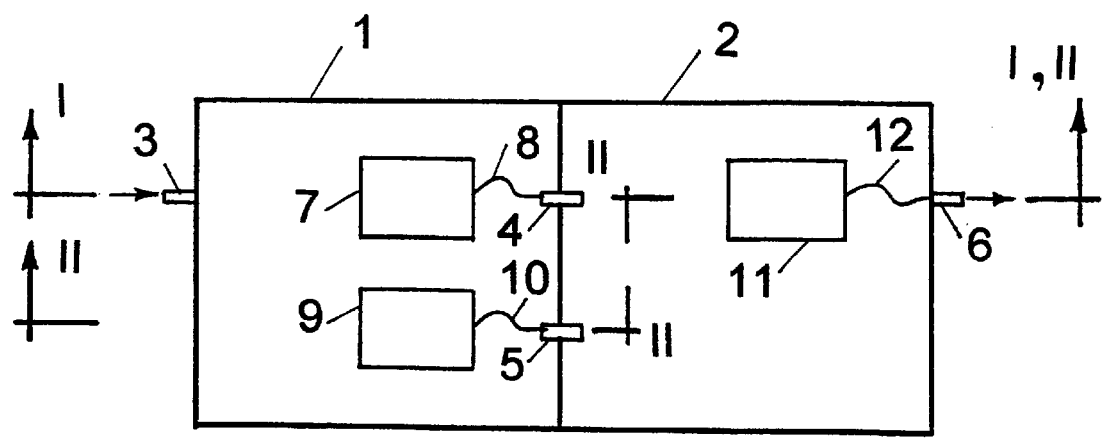
FIG. 1 is a plan view of a multistage system showing the basic arrangement of the present invention.
Figure 2:
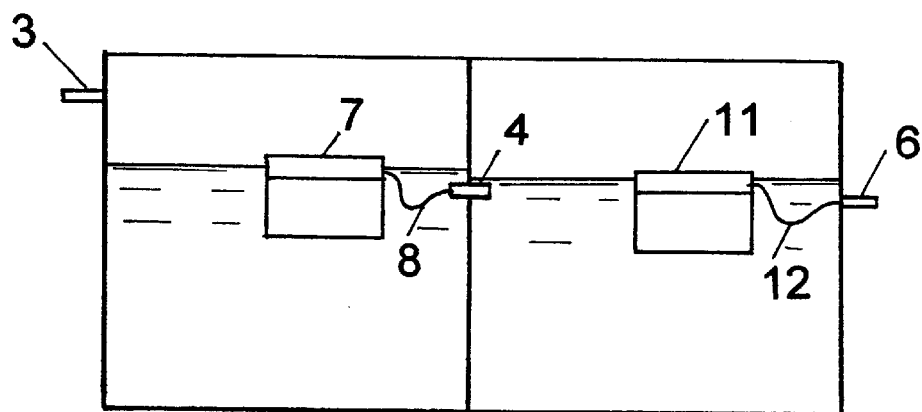
FIG. 2 is a cross-sectional view taken along lines I—I in FIG. 1.
Figure 3:
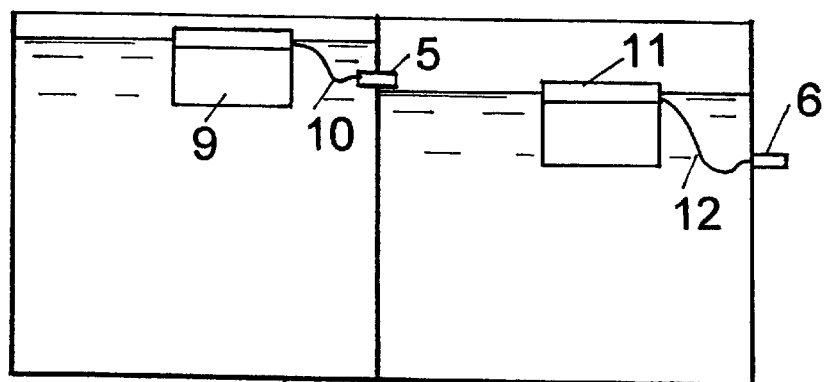
FIG. 3 is a cross-sectional view taken along lines II—II in FIG. 1.

The basic system as shown in FIGS. 1, 2, and 3 comprises two consecutive stages of biological reaction 1 and 2. More than two reactors can be included in the plurality of reactors in the multistage system. Stage 1 has an intake line 3 (a pipe or a channel), at least one lower elevation flow transfer means 7 (for example, a floating clarifier, or a floating weir, or a combination of the two) having an intake opening (for example, at the bottom as in Imhoff clarifier as shown later) and a discharge line 8. For a floating flow transfer means, line 8 can be a flexible line. Line 8 is connected to a reactor connecting line 4 at a fixed vertical position in the wall (or walls, if these reactors are made of separate vessels) between reactor stages 1 and 2. At least one flow transfer means 9 with a flexible line 10 connected to a line 5 is provided in the stage 1. Line 5 is higher than the line 4. For example, means 9 can be another floating clarifier, or a weir, or a combination of a clarifier and a weir. Stage 1 can be used separately from stage 2 as an independent single-tank equalization basin-reactor system. In the stage 2, at least one flow transfer means 11 with a discharge line 12 attached to the effluent line 6 is provided. In case the means 11 is a floating clarifier or a weir, the line 12 can be a flexible line. Flexible lines 8, 10, and 12 can be made, for example, of metal or rigid plastic pipes with movable joints, or of flexible hoses. Additionally referring now to FIGS. 9 and 10, there is shown an example of a floating clarifier made of flexible plastic. It is supported by six floats 66, which hold a rigid frame made of three beams 67 and two water collection troughs 68a and 68b. Hooks 70 are secured to the beams 67. Two flexible plastic side walls 81 and 82 with eyeloops at the top and at the bottom are provided. Bars 72 are inserted in the upper eyeloops and placed on the hooks 70. Strips 73 are inserted in the lower eyeloops. The side walls 81 and 82 are connected to the plastic front and back walls 64 and 65 which are also secured to the rigid frame by hooks 70. Three vertical bars 70 with top nuts 71 and bottom spacers 75 and 76 pass through the holes in the beams 67 and the strips 73 and support the side walls 81 and 82 at the bottom and fix the bottom opening between these walls. Pipes 69a and 69b are attached to the collection troughs 68a and 68b. Pipes 69a and 69b can be joined and than attached to lines 8 and 4 (or 10 and 5), or one of this lines can be attached to the lines 8 and 4, while the other is attached to the lines 10 and 5. Multiple clarifiers can be used. More than two collection troughs in a single clarifier can be used. These troughs can be attached to the reactor connecting lines at different elevations. The clarifier of FIGS. 9 and 10 can be used as items 7, 9, and 11 in FIGS. 1, 2, and 3. Additional weirs can be attached to the clarifier outside for transferring mixed liquor.

Referring now to FIGS. 1, 2, and 3, the multistage treatment process is operated as follows.

The influent is fed in the reactor 1 via influent line 3, where it is treated and at least partially partially equalized. The treated and partially equalized flow is collected and discharged (when the reactor 1 is used independently), or transferred to the reactor 2 by using the flow transfer means 7 and 9 via flexible lines 8 and 10 and the connecting lines 4 and 5. Thus transferred liquid is additionally treated and equalized in the reactor 2 and is discharged by using the flow transfer means 11 via lines 12 and 6. Various chemical, biological, and other processes known to the skillful in art can be performed in an independent reactor 1, or in reactors 1 and 2. The equalization occurs as follows. At a certain moment after sustained low flows of the influent the flow transfer means 7 and 9 are at their lower elevation which is determined by the elevation of the line 4, the lower of lines 4 and 5. For as long as the influent flow does not exceed the capacity of the flow transfer means 7, both means 7 and 9 remain at the lowest position. When the influent flow through line 3 increases above the capacity of the flow transfer means 7, liquid in the reactor 1 accumulates. Respectively, both means 7 and 9 rise. During the rise up to the higher elevation reactor connecting line 5, only the means 7 transfers the liquid to the reactor 2. At liquid elevations above the line 5, means 7 and 9 transfer liquid downstream. If the influent flow is greater than the combined capacity of these two means, the liquid level in the reactor 1 rises till the influent flow declines below the transfer means capacity. Two flow transfer means provide a so called step-wise flow control: the flow transferred to the reactor 2 equals either the capacity of one (lower) transfer means, or the total capacity of the two transfer means. More than two flow transfer means can be used at more than two elevations. Additionally, an overflow passage at a preset maximum allowable liquid level in the reactor 1 can be provided. A step-wise control provides partial flow equalization. Partial flow equalization requires less volume than the complete equalization. Changes in the liquid level in the reactor 1 and the required reactor volume are also smaller as compared to a case of complete equalization. A partially equalized flow enters the reactor 2 and is further equalized. If multiple flow transfer means in the reactor 2 are attached to effluent lines 6 of the same elevation, the complete flow equalization will result, except for the sustained minimum flow when the flow transfer means will be at the lower position and will discharge the flow below their total capacity. For complete equalization, the total capacity of the flow transfer means should be found as a conservative estimate of the average flow rate of the influent. The required equalization volume in the reactor 2 for the flow already partially equalized is smaller than that needed for the nonequalized influent. Accordingly, a smaller depth increment is assigned for the flow equalization. More than two reactors in sequence can be provided with the flow transfer means activated at preset liquid elevations in the reactors. The use of floating clarifiers as the flow transfer means offers a specific advantage over the conventional fixed clarifiers because it permits a simple gravity flow across the multistage treatment train for the variable influent flow.

Referring now to FIGS. 1, 2, and 3, a single independent reactor 1 can be used as acombined system for treatment of storm water and municipal (or industrial) wastewater. During dry weather, lower level floating clarifiers will be used, and both, lower and upper level floating clarifiers will be used in wet weather.

Figure 9:
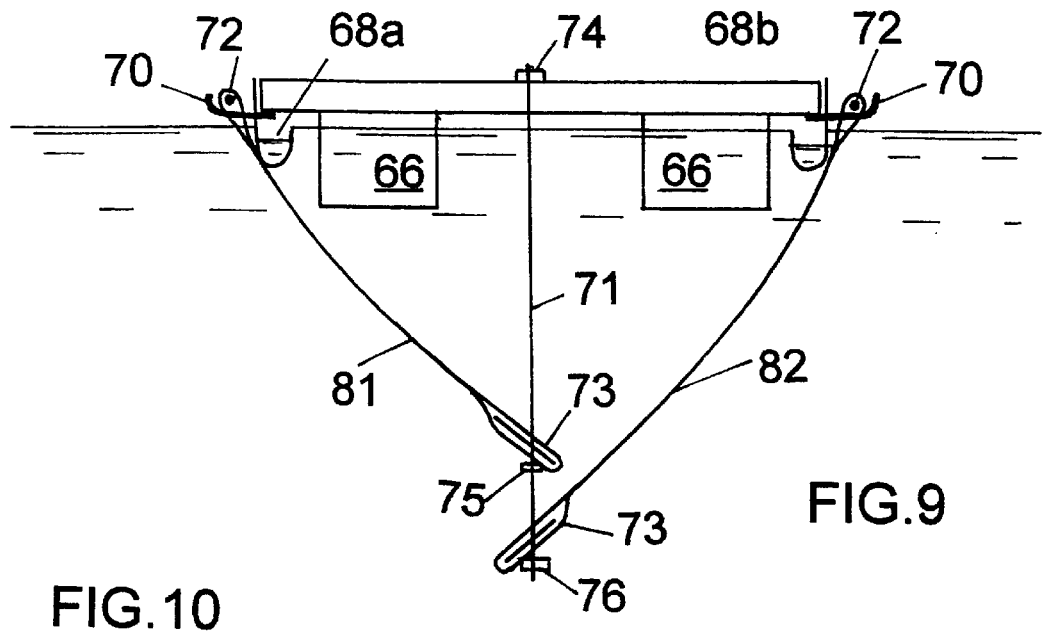
FIG. 9 is a cross-sectional view of a floating Imhoff clarifier made of flexible material.
Figure 10:
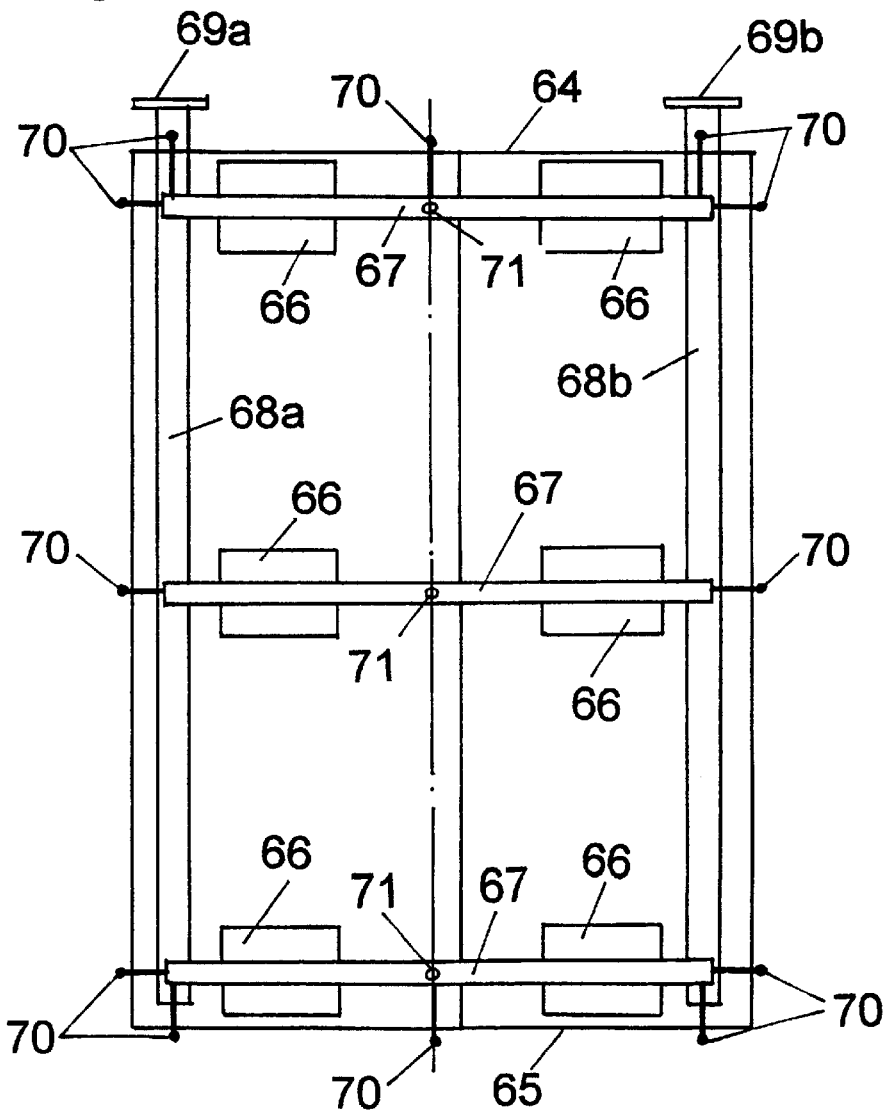
FIG. 10 is plan view of the clarifier shown in FIG. 9.
Figure 11:
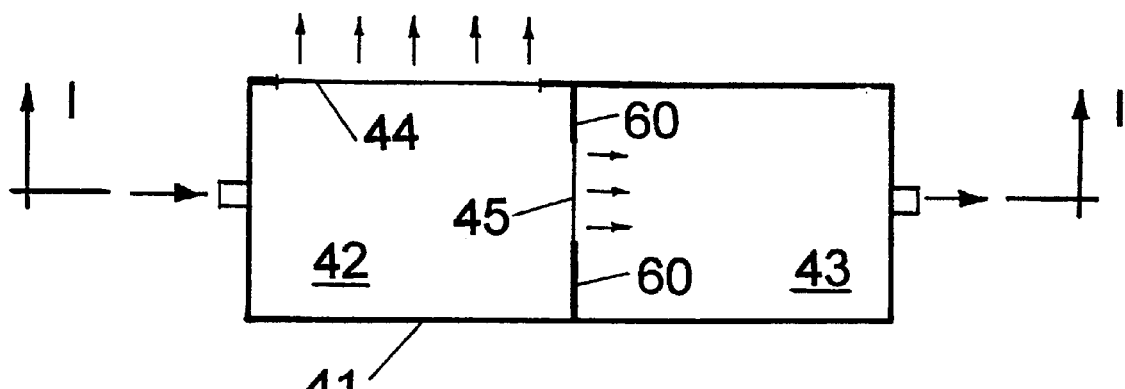
FIG. 11 is plan view of the flow splitter and cut off transfer weir for the influent.
Figure 12:
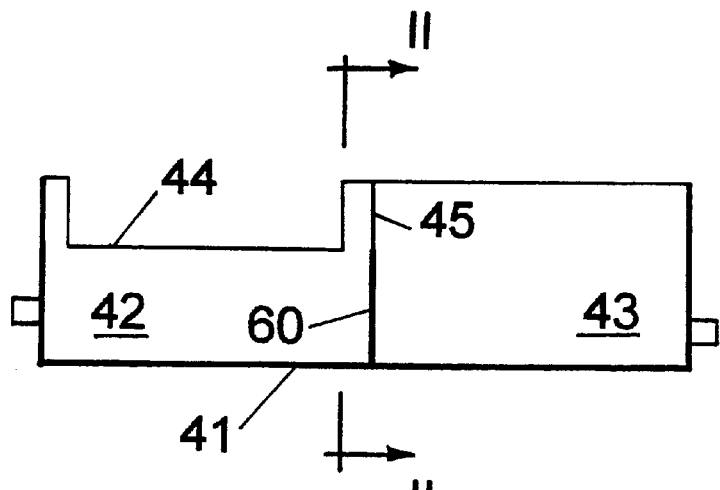
FIG. 12 is a view along lines I—I in FIG. 11.
Figure 13:
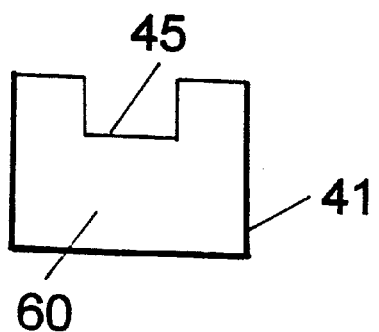
FIG. 13 is a view along lines II—II in FIG. 11.

Referring now to FIGS. 9 and 10, the floating clarifier is operated as follows. It rises and descends with the liquid level fluctuations in reactors 1 and 2. Additionally, the mixed liquor enters the clarifier through the bottom opening between the side walls 81 and 82 and flows upward. The suspended biomass flocculates, settles down, and passes back in the reactor via the said bottom opening. The clarified water is collected in the troughs 68a and 68b, and is discharged via pipes 69a and 69b followed with the pipes 8 and 4, and/or 10 and 5, and 12 and 6. This discharge occurs when the said troughs in the clarifier are lifted above the level of the respective connecting and effluent pipes and above the level of the liquid in the subsequent reactor into which the liquid is discharged.

Figure 4:
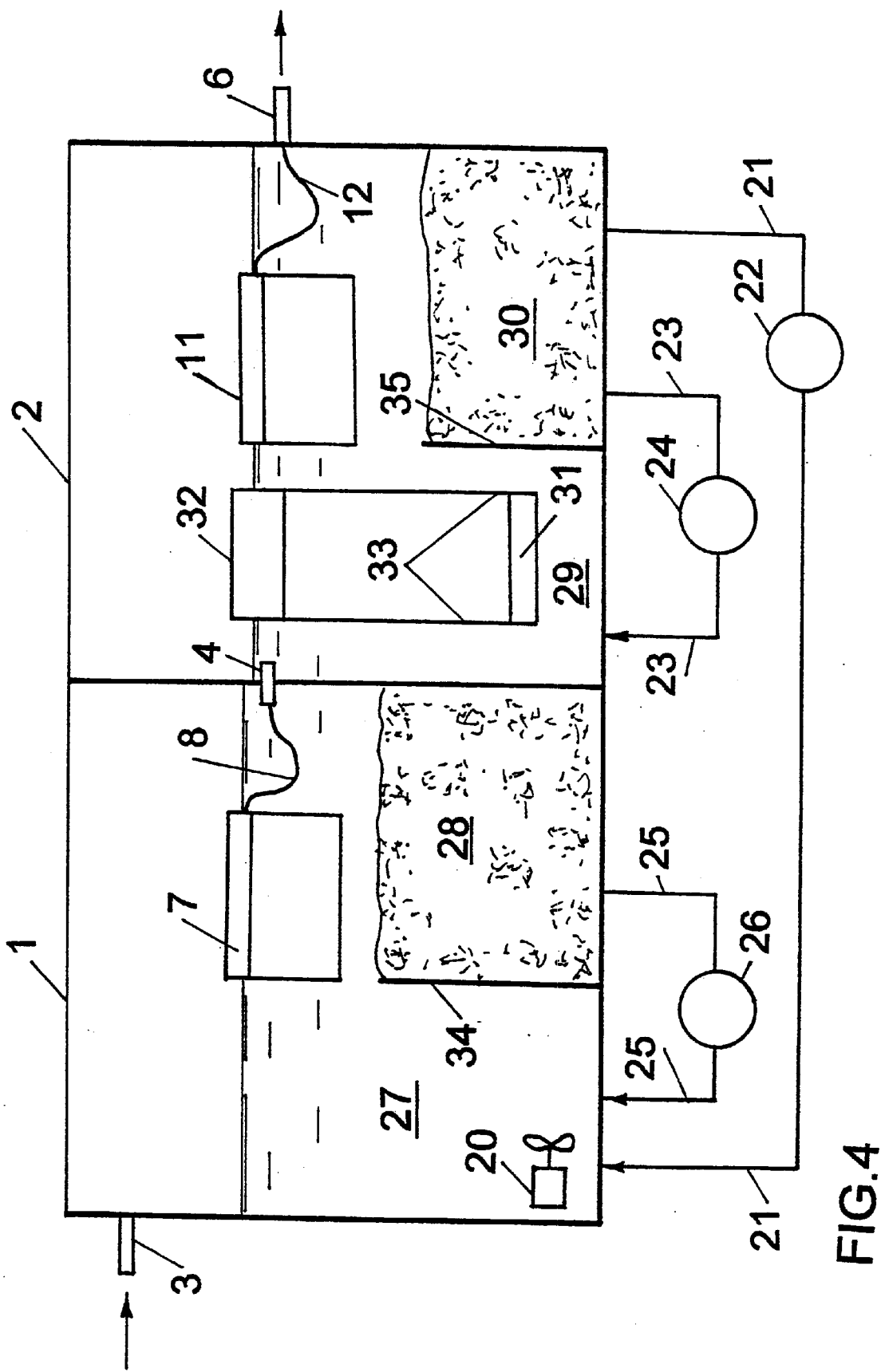
FIG. 4 is a view similar to FIG. 2 and showing the first anaerobic reactor with a sludge conditioner and a mixer.

Referring now to FIG. 4, there is shown an example of an anaerobic-aerobic system for wastewater treatment.This is a cross-section of the apparatus similar to that shown in FIGS. 1, 2, and 3, and descriptions of the same elements will not be repeated. Anaerobic reactor 1 is divided by a baffle 34 into a reaction zone 27 and a sludge conditioning zone 28. A line 25 and a pump 26 are provided for the conditioned sludge feed from the sludge conditioner 28 to the reaction zone 27. A mixer 20 is installed for mixing the liquor in the reaction zone 27. The aerobic reactor 2 is divided by a baffle 35 into an aeration zone 29 and a sludge conditioner zone 30, optionally, zone 30 can be an anaerobic zone. The aeration zone 29 is provided with diffused air floating aerators 31 connected to floats 32 by braces 33. Alternatively, floating mechanical aerators can be used. A line 23 with a pump 24 is provided for the sludge feed from the conditioner 30 to the reaction zone 29. A line 21 with a pump 22 is provided for the sludge feed from the conditioner 30 to the reaction zone 27 in the reactor 1. Optionally, various combinations of lines with pumps can be provided between zones 27, 28, 29, and 30. The apparatus of FIG. 4 is operated as follows. The flow equalization occurs as previously described for the FIGS. 1, 2, and 3. The anaerobic degradation of the influent constituents occurs in the section 27 by the microorganisms grown in this section and transferred from the section 28 to the section 27 via line 25 by a pump 26. The anaerobically treated liquid enters the floating clarifier 7, for example, Imhoff clarifier, where the sludge is separated and settled down in the zone 28, while the clarified liquid is transferred to the reactor 2, aerated zone 29. The settled anaerobic sludge is conditioned as known to the skillful in art. The anaerobically treated liquid is further treated in zone 32 by a mixed liquor substantially made of aerobic and facultative organisms. This mixed liquor enters the floating clarifier 11, for example, Imhoff clarifier, where the sludge is separated and settled down in the zone 30, while the clarified and treated liquid is discharged from the system via effluent line 6. In zone 30, the sludge is conditioned, for example under anaerobic conditions. This sludge can be transferred to reaction zones 29 and/or 27, or to an anaerobic sludge conditioner 28 (not shown). Part of the anaerobic mixed liquor from zone 27 can be transferred to the aerobic reaction zone 29 using the previously described floating weir, and/or part of the conditioned sludge from zone 28 can be transferred to zone 29 by pumping (not shown). The excess sludge can be discharged, preferably, from the sludge conditioning zones 28 and 30.

Referring now to FIG. 4, tank 2 can be used separately from the tank 1, for example, as an aerobic treatment system for combined municipal (or industrial) and storm influents. Tank 2 can be additionally provided with the upper level floating clarifiers (not shown, but analogous to the reactor 1), wherein the lower level clarifiers would be used in dry weather, and the lower and upper level clarifiers will be used during wet weather. Optionally, airlifts, or other lifting or mixing means can be provided for scouring the sludge from the bottom and/or transporting it to the higher elevations in the reactor in addition to the floating aerators when the water stage in the tank 2 rises to a level at which aerators cannot sufficiently suspend the sludge.

Figure 5:
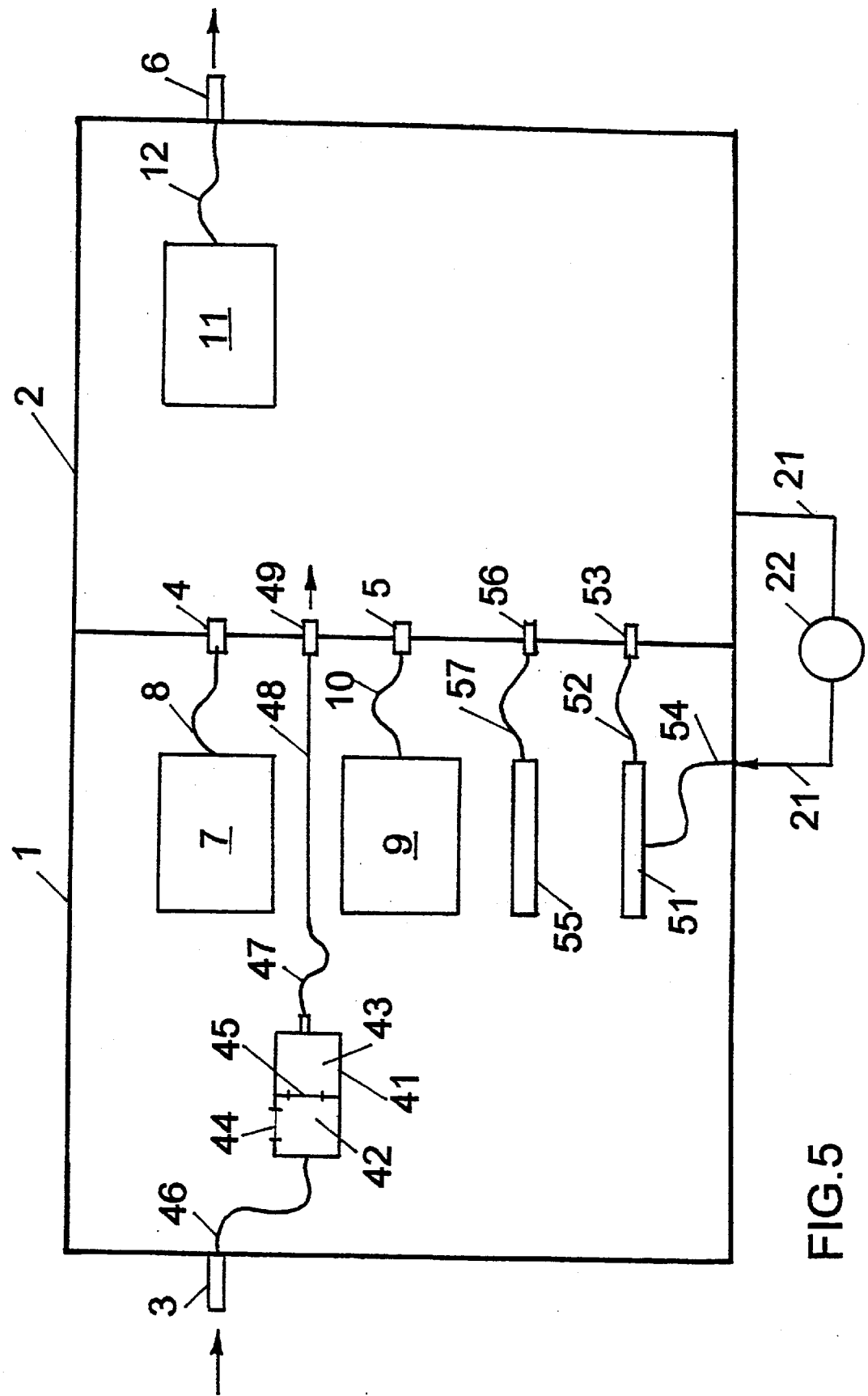
FIG. 5 is a view similar to FIG. 3 but showing additionally a cut off weir for transferring at least part of the influent to the second reactor, a liquid transfer weir, and a cut off weir.
Figure 6:
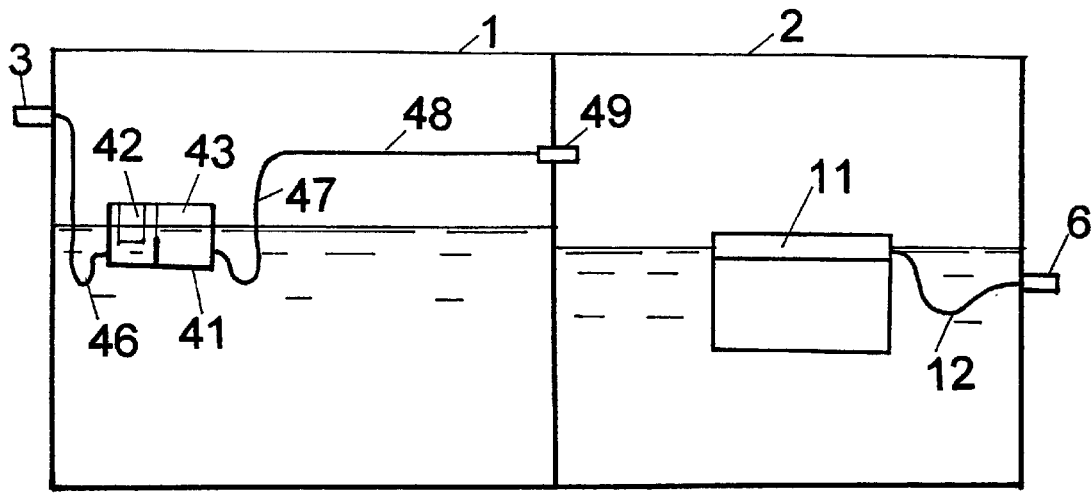
FIG. 6 is a view similar to FIG. 2 and showing a flow splitter and a cut off weir for the influent flow.
Figure 7:
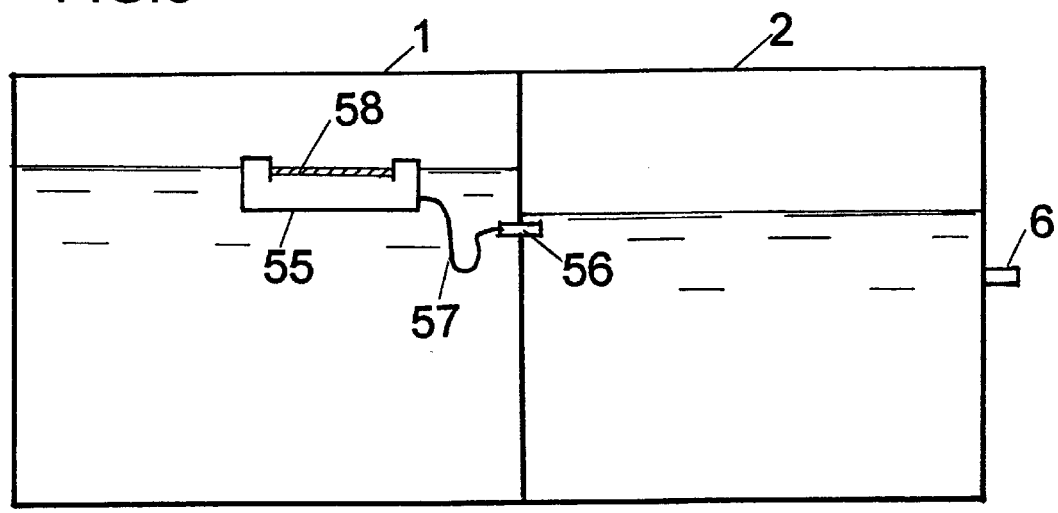
FIG. 7 is a view similar to FIG. 2 also showing a flow transfer weir.
Figure 8:
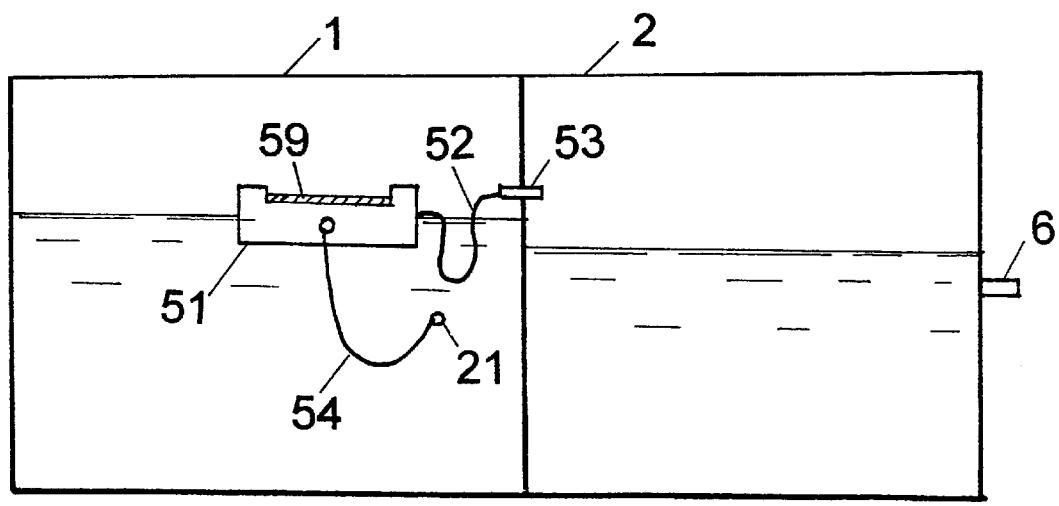
FIG. 8 is a view similar to FIG. 2 and showing a cut off weir.

Referring now to FIG. 5, this is a plan of the system similar to that shown in FIG. 1, but additionally having a floating means 41 for splitting the influent flow between reactors 1 and 2, a floating flow transfer weir 55, and a floating cut off weir 51. Additionally referring now to FIGS. 6, 11, 12, and 13, there is shown a floating flow splitting means 41 comprising an influent flow splitter compartment 42 with a flow control weir 44 (in the side wall) discharging to the reactor 1 and a flow cut off weir 45 (in the wall 60) discharging in a compartment 43. Compartments 42 and 43 are provided with flexible connections 46 and 47 to the influent line 3 and a pipe 48 and a connection line 49 leading to the reactor 2. Additionally, referring now to FIG. 7, there is shown a floating flow transfer means 55 with a weir 58, the said means is connected to the reactor connecting line 56 via flexible line 57. The elevation of the weir 58 is below the liquid level in the reactor 1. Additionally, referring now to FIG. 8, there is shown a floating flow cut off means 51 with a weir 59, the said means is connected to the recycle cut off line 53 via flexible line 52. Lines 21 with a pump 22 and a flexible line 54 connect the reactor 2 with the floating cut off means 51. The elevation of the weir 59 is above the liquid level in the reactor 1. Floats for the floating means described herein are not shown to avoid trivial details. Skilled artisans can provide such floats.

The floating flow splitting means 41 is operated as follows. The influent is fed in the compartment 42. If lines 48 and 49 are above the elevation of the weir 45, the entire influent flow is fed in the reactor 1 via discharge weir 44. At greater influent flows, when the floating means 41 rises and the weir 45 is above the level of lines 48 and 49, part of the influent flow is split to the reactor 2. Now, skilled artisans can easily design this device for splitting the flow to more than one downstream reactor. It is easy to split the flow in equal or desired unequal portions. Simplicity, versatility and ease of operation are the advantages of the floating means for flow splitting.

The floating flow transfer means 55 is operated as follows. When liquid level in the reactor 1 is below the line 56, there is no flow via the floating weir 55. With the influent flow to the reactor 1 increasing, the liquid level rises and the floating means 55 is lifted above the line 56, the liquid from the reactor 1 flows over the weir 58 into the means 55 and via lines 57 and 56 in the reactor 2.

The floating flow cut off means 51 is operated as follows. The pump 22 continuously delivers a flow of the recycled liquid from the reactor 2 to the reactor 1. This liquid can be mixed liquor, or separated sludge, or conditioned sludge. At low liquid levels in the reactor 2, the recycled flow is discharged via weir 59 in the reactor 1. When the liquid level in the reactor 1 rises and the floating cut off means 51 is lifted above the line 53, the flow delivered by the pump 22 is returned to the reactor 2 (or, optionally, any desired section of a downstream reactor).

The floating flow splitting means 41, the floating flow transfer means 55, and the floating flow cut off means 51 help to equalize flows and transfer the influent and biomass in multistage reactor system by transferring the maximum influent flows and the liquid from the upstream reactors in the less hydraulically loaded downstream reactors, and by reducing the hydraulic loading due to flow recycling in the upstream reactors in the periods of higher influent flows. Accordingly, the required equalization volumes are better allocated among the reactors, and the needed throughput capacities of the clarifiers in particular treatment stages are reduced.

The embodiments of FIGS. 1 to 13 show many arrangements for producing unexpected useful effects in the simultaneous equalization and chemical, physical-chemical, and biological treatment of influent materials. It will therefore be understood by the skilled in the art that the particular embodiments of the invention here presented are by way of illustration only, and are meant to be in no way restrictive; therefore, numerous changes and modifications may be made, and the full use of equivalents resorted to, without departing from the spirit or scope of the invention as outlined in the appended claims.

What is claimed is:

1. In a multi-stage apparatus for chemical, physical-chemical, and biological treatment and equalization of variable flows of influent material, wherein said influent material is processed in a plurality of sequential reactors containing liquid and having influent, reactor connecting and effluent lines, the improvement comprising:

at least two reactors providing means for flow equalization, the said two reactors being selected from the said plurality of sequential reactors, a lower elevation connecting line connecting a floating flow transfer means within an upstream equalization reactor to a downstream equalization reactor, and at least one higher elevation connecting line connecting a floating flow transfer means within said upstream equalization reactor to said downstream equalization reactor.

2. The apparatus as claimed in claim 1, wherein the said flow transfer means are selected from a group comprising floating weirs and floating clarifiers.

3. The apparatus as claimed in claim 2, wherein the said floating weirs and floating clarifiers within the said at least two reactors are connected to the said reactor connecting or discharge lines by flexible connections.

4. The apparatus as claimed in claim 2, wherein walls of the said floating weirs and floating clarifiers are made from a flexible material.

5. The apparatus as claimed in claim 2, wherein the said floating clarifiers are selected from a group comprising Imhoff clarifiers, vertical flow clarifiers, horizontal flow rectangular clarifiers, and clarifiers with suspended sludge blanket.

6. The apparatus as claimed in claim 5, wherein the said floating clarifiers are provided with means for sludge evacuation.

7. The apparatus as claimed in claim 1, and further including means for simultaneously directing said influent material to more than one of the said stages in the said plurality of reactors.

8. The apparatus as claimed in claim 7, wherein the said means for simultaneously directing said influent material to more than one of the said stages includes at least one floating cut off means having a first weir in communication with one stage and a second weir in communication with a flexible line connected to a connecting line in communication with a downstream stage.

9. The apparatus as claimed in claim 1, and further including additional means for transferring at least one flow of the liquid contained in at least one reactor into at least one reactor in the said plurality of sequential reactors.

10. The apparatus as claimed in claim 9, wherein the said means for transferring liquid includes a floating weir.

11. The apparatus as claimed in claim 10, wherein the said floating weir is a cut off weir in communication with a flexible line connected to a connecting line in communication with a downstream stage.

12. The apparatus as claimed in claim 1, wherein the said stages are selected from the group consisting of anaerobic, facultative, anoxic, aerobic and polishing reactors for biological reactors.

13. The apparatus as claimed in claim 1, wherein the said plurality of sequential reactors comprises alternating anaerobic and aerobic reactors.

14. The apparatus as claimed in claim 13, wherein the said alternating reactors are selected from the group consisting of alternating anaerobic and aerobic zones, and reactors having means for providing alternating aerobic and anaerobic conditions in the same reaction vessel.

15. The apparatus as claimed in claim 14, and further including a reactor for simultaneously exposing the said influent material in at least one stage to both anaerobic and aerobic biomass.

16. The apparatus claimed in claim 1, and further including at least one sludge conditioning zone in at least one reactor in the said plurality of sequential reactors.

17. The apparatus as claimed in claim 16, wherein the said sludge conditioning zone is selected from the group comprising aerobic and anaerobic zones.

18. The apparatus as claimed in claim 16, wherein the said at least one sludge conditioning zone is provided with means for transferring the conditioned sludge from the said at least one sludge conditioning zone in at least one other reactor to the said plurality of sequential reactors.

19. The apparatus as claimed in claim 1, and further including means for adding powdered activated carbon in at least one reactor in the said plurality of sequential reactors.

20. The apparatus as claimed in claim 1, and further providing floating diffused air aerators in at least one reactor in the said plurality of sequential reactors.

21. The apparatus as claimed in claim 20, and further providing means for scouring and lifting sludge from the reactor bottom at a high water stage in the said reactor.

22. In a single-stage apparatus for chemical, physical-chemical, and biological treatment and equalization of variable flows of influent material, wherein said influent material is processed in a reactor containing liquid and having influent and at least two effluent lines, the improvement comprising:

the said at least one reactor providing means for flow equalization, at least one lower elevation connecting line connecting a floating flow transfer means within the said equalization reactor to at least one discharge line, and at least one higher elevation connecting line connecting a floating flow transfer means within the said equalization reactor to a downstream equalization reactor.

* * * * *